(No Model.)

T. V. CURTIS.
EGG BOILER.

No. 251,193.   Patented Dec. 20, 1881.

Witnesses:
W. C. McArthur,
John C. Kilby.

Inventor:
Thomas V. Curtis.
per Chas. H. Fowler
Attorney.

UNITED STATES PATENT OFFICE.

THOMAS V. CURTIS, OF ST. PAUL, MINNESOTA.

EGG-BOILER.

SPECIFICATION forming part of Letters Patent No. 251,193, dated December 20, 1881.

Application filed October 31, 1881. (No model.)

*To all whom it may concern:*

Be it known that I, THOMAS V. CURTIS, a citizen of the United States, residing at St. Paul, in the county of Ramsey and State of Minnesota, have invented certain new and useful Improvements in Egg-Boilers; and I do hereby declare that the following is a full, clear, and exact description of the same, reference being had to the annexed drawings, making a part of this specification, and to the letters and figures of reference marked thereon.

Figure 1:
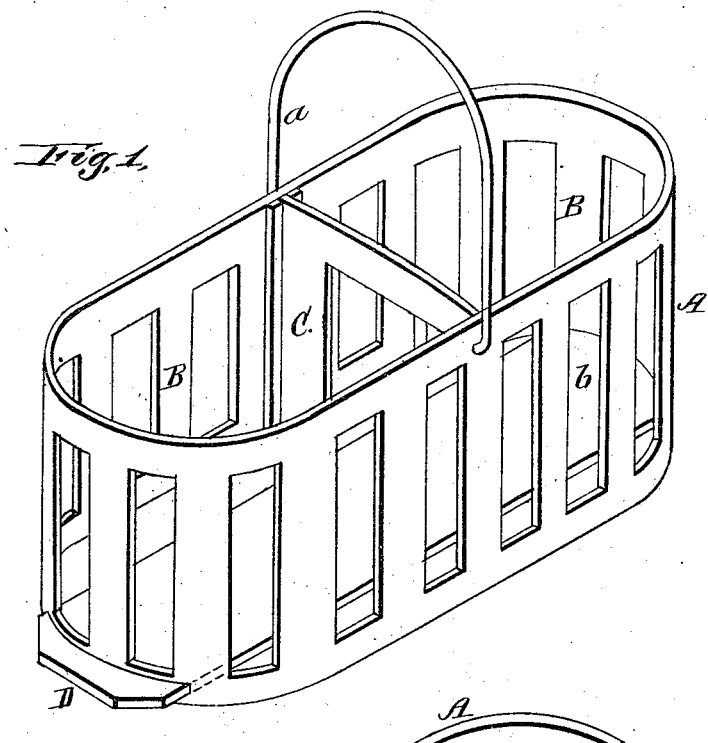
Figure 2:
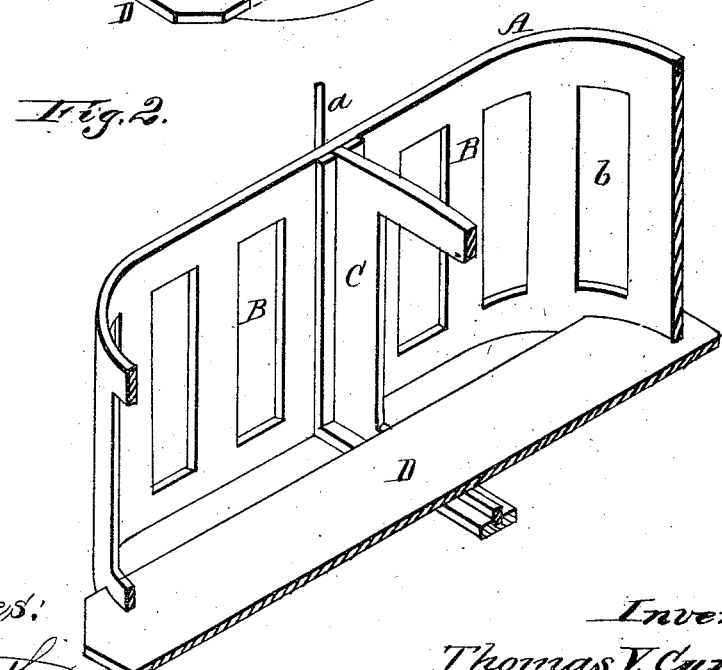

Figure 1 of the drawings is a perspective view of my invention, and Fig. 2 is a longitudinal vertical section of the same.

The present invention has relation to certain new and useful improvements in devices for boiling eggs in the shell; and the object thereof is to improve the construction and efficiency of the device, whereby two or more lots of eggs can be boiled to different degrees of hardness and the water immediately drained off the moment the device, with the eggs, is taken from the kettle or other vessel holding the boiling water, and facilitating the removal of the eggs through the bottom of the device, and transferred to the dish or other receptacle without the necessity of handling them or endangering the breaking of the shell. These objects I attain by the construction substantially as shown in the drawings and hereinafter described.

In the accompanying drawings, A represents the receptacle, of any desirable size or shape, for holding the eggs while being boiled, and is provided with any suitable handle or bail, a, for convenience in lifting the receptacle out of the water or replacing it. The receptacle A is preferably constructed of sheet metal, with openings b; or, if desired, these openings may be dispensed with; or the receptacle, instead of being of sheet metal, may be constructed of wire, which, like that shown, forms a kind of a cage to hold the eggs and allows the boiling water to freely circulate through the sides of the receptacle. A further advantage in the use of sheet metal with the openings b around the body of the receptacle is the comparative small cost in their manufacture and the economy in the metal used. The sheets of metal being stamped out with the openings and afterward bent into shape by suitable machinery forms a much more durable and a stronger receptacle than if made of wire.

The receptacle A, which I have previously stated may be of any desirable size, is divided off into two or more compartments, B, by partitions C, which are of skeleton form, so that water can pass from one compartment to the other, and also to admit of the sliding bottom D passing through it and serving as a support for the bottom at or near its center. The bottom D passes through narrow openings at each end of the receptacle A, and can be withdrawn from either end thereof, as circumstances may require, the bottom being in length slightly greater than the length of the receptacle, so that the ends will project sufficiently to enable it to be taken hold of with the fingers in withdrawing or replacing it.

Where the receptacle A has several separate compartments for the eggs, it is essential that the skeleton-partitions C be so connected to the receptacle as to admit of their ready removal, to combine two or more compartments in one, to increase its capacity, when a large number of eggs are to be boiled of equal hardness.

The sliding bottom D, it should be noticed, is considerably less in width than the width of the receptacle, so that a wide space will be left between the bottom at its outer edges and the interior sides of the receptacle. The object of this space is to insure the water quickly draining off immediately upon lifting the receptacle out of the kettle or vessel of water. This feature is considered of importance, as were the sides or bottom of the receptacle simply provided with fine perforations the water would not rapidly drain off, or at least not immediately or simultaneously with the raising of the receptacle out of the water. This not only wastes time, but while waiting for the water to completely drain off the eggs in the receptacle would be cooking, thereby not enabling one to judge with any accuracy the time required to boil the eggs to the degree of hardness required. This, however, is entirely overcome, and in hotels, where a large number of eggs is required to be boiled at the same time, my invention is considered of great value.

The sliding bottom is a feature of my invention which I consider of importance, especially in receptacles constructed for containing a large number of eggs, there being no danger of breaking the shell of the eggs in depositing them in the dish, as would be the case were the bottom hinged.

If desired, the bottom D may be constructed in the form of a grate, or, in other words, having alternate bars and spaces similar to the body of the receptacle A, in which case the bottom could be of the same width as the interior of the receptacle. The skeleton-partition C may also be constructed with these parallel bars and spaces, as found desirable.

Having now fully described my invention, what I claim as new, and desire to secure by Letters Patent, is—

1. An egg-boiler consisting of a receptacle for the eggs, constructed, substantially as described, for admitting the rapid draining of the water after being lifted out of the water in the kettle or other vessel, and provided with a sliding bottom for removing the eggs through the lower end of the receptacle, substantially as and for the purpose set forth.

2. In an egg-boiler, the combination, with a receptacle for holding the eggs, divided into two or more compartments by suitable partitions, of a sliding bottom extending the entire length of the receptacle, to form a support for the eggs in each compartment and adapted to be operated from either end, substantially as and for the purpose specified.

3. An egg-boiler consisting of the receptacle A, skeleton-partition C, and sliding bottom D, substantially as and for the purpose set forth.

In testimony that I claim the above I have hereunto subscribed my name in the presence of two witnesses.

THOMAS V. CURTIS.

Witnesses:
F. L. ROGERS,
JAS. M. BRONSON.